UNITED STATES PATENT OFFICE.

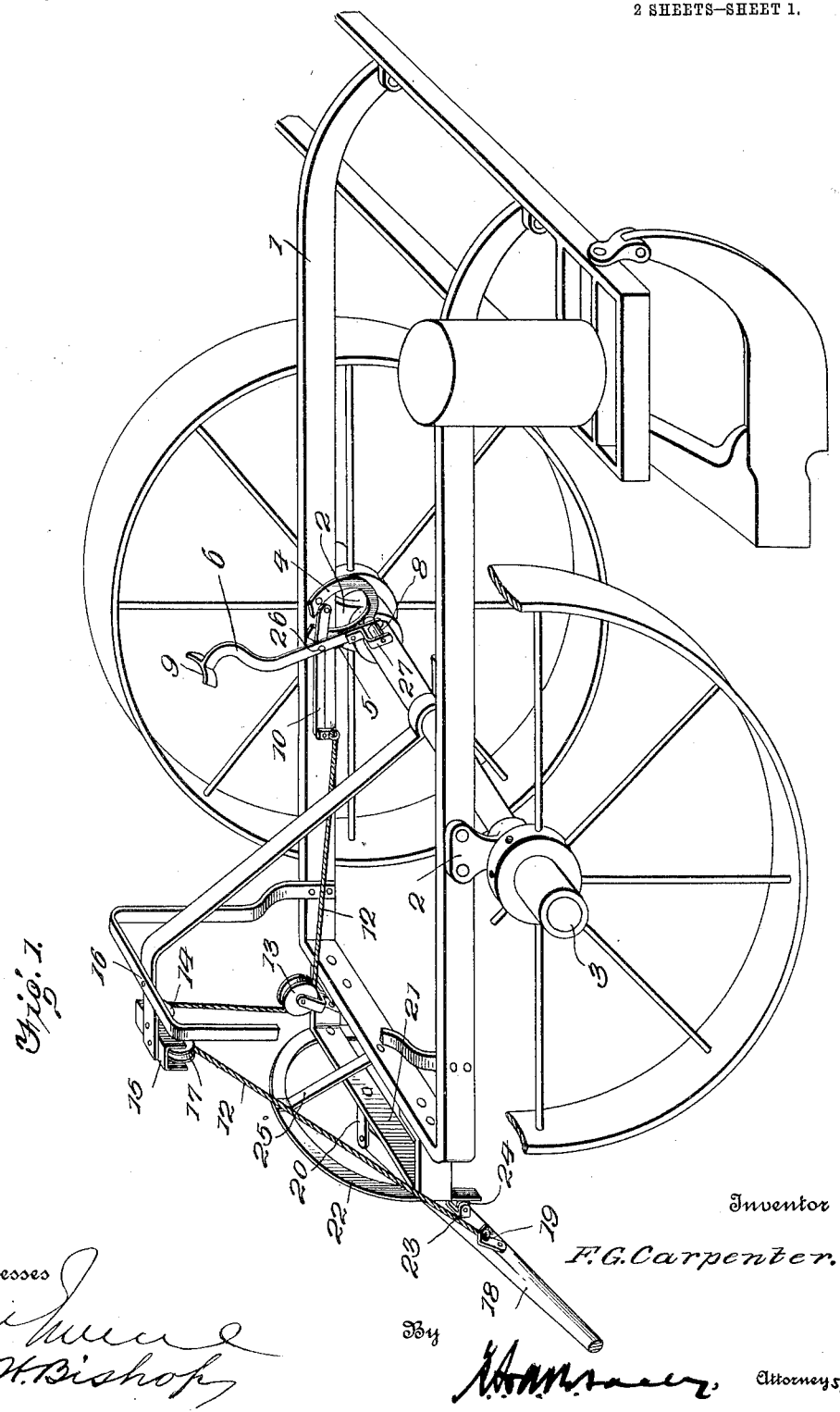

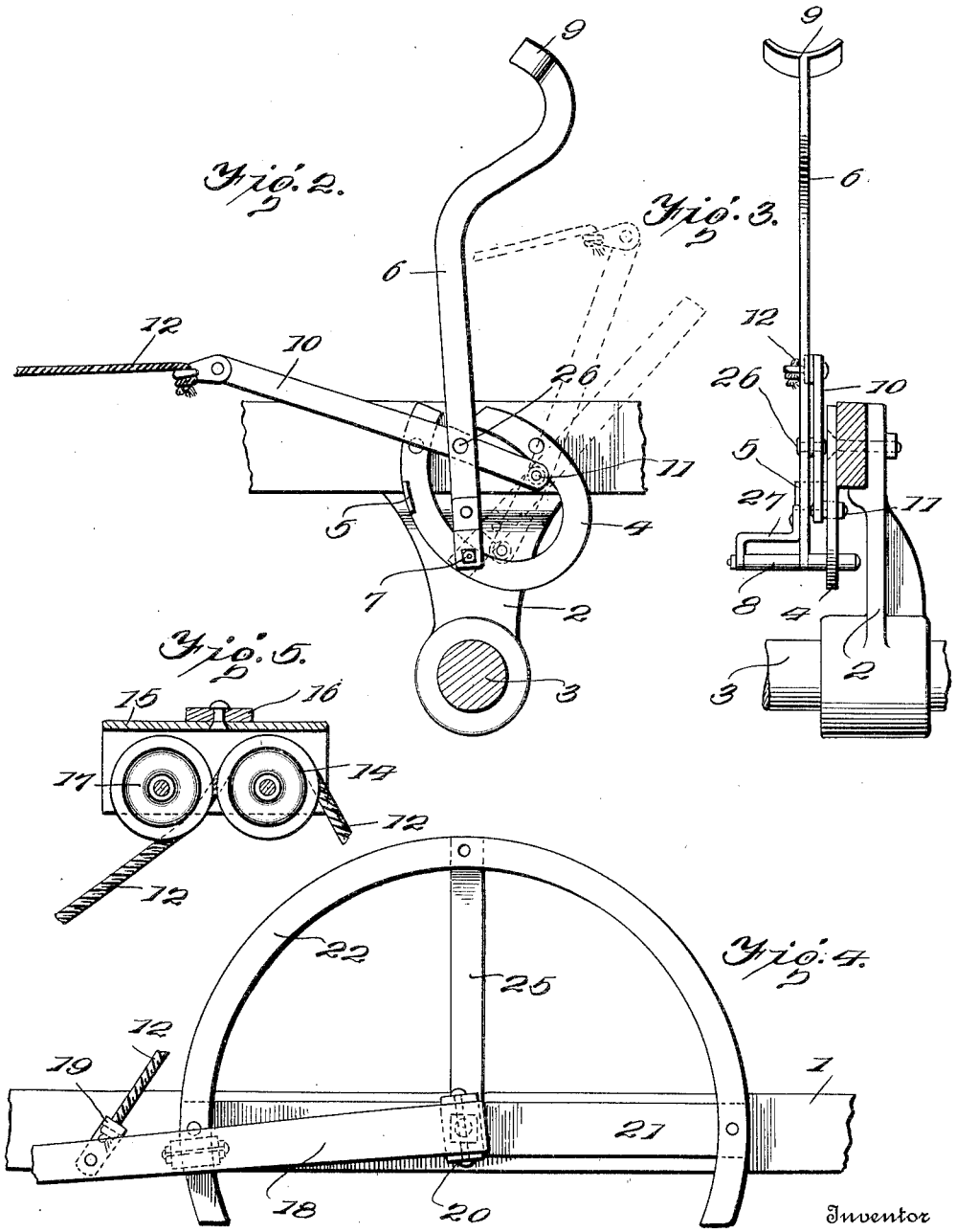

FRANK G. CARPENTER, OF OAK PARK, VIRGINIA.

LAND-MARKER FOR PLANTERS.

1,097,611.  Specification of Letters Patent.  Patented May 26, 1914.

Application filed September 9, 1913. Serial No. 788,842.

*To all whom it may concern:*

Be it known that I, FRANK G. CARPENTER, a citizen of the United States, residing at Oak Park, in the county of Madison and State of Virginia, have invented certain new and useful Improvements in Land-Markers for Planters, of which the following is a specification.

This invention relates to land markers for corn and other planters, and has for its object the provision of means whereby the marker may be reversed at the end of a field without the operator being required to dismount and manually manipulate it.

The invention also seeks to provide novel and efficient means whereby the marker may be swung to either side of the planter without excessive labor on the part of the operator.

The invention also seeks to provide mechanism for the stated purpose which will be composed of few parts and be compactly arranged so that it will not interfere in any manner with the ordinary use of the planter.

The stated objects, and such other objects as will incidentally appear as the description of the invention proceeds, are attained in a mechanism of the character illustrated in the accompanying drawings, and the invention resides in certain novel features which will be particularly pointed out in the claims following the detailed description.

In the drawings: Figure 1 is a perspective view of my improved mechanism showing a portion of a planter frame in order to more clearly illustrate the arrangement and operation: Fig. 2 is an enlarged side elevation of the operating lever and the parts immediately adjacent thereto; Fig. 3 is a front elevation of the same; Fig. 4 is a rear elevation of a portion of the planter frame with a part of the marker connected therewith; Fig. 5 is a detail view of a portion of the operating cable and guide rollers for the same.

The planter frame 1 may be of any preferred construction and is illustrated in the accompanying drawings in a somewhat conventional manner merely to more clearly define my invention. In carrying out my invention, I secure to one side bar of the planter frame by the same bolts which secure the brackets 2 or other supports for the axle 3, a cam guide 4 which is, generally stated, of a horseshoe form and is provided at its rear edge with a stop 5 to limit the rearward movement of the operating lever 6. The said lever 6 is fulcrumed at 7 upon a pin 8 secured rigidly in and projecting inwardly from the guide 4, and in its inactive or normal position, extends somewhat rearwardly and upwardly from its pivotal point so that it may be conveniently reached by the foot of the driver, the upper extremity of the lever being equipped with a treadle or other form of foot rest 9, as will be readily understood. Above the lower end of the said lever 6, I pivotally attach thereto a supplemental lever 10 which has its front end extended beyond the foot lever and equipped with a guide pin or roller 11 bearing against and adapted to ride upon the inner surface of the cam guide 4. To the rear end of the supplemental lever, I attach the front end of the operating cable 12 which extends rearwardly from the said lever and passes under a guide roller or pulley 13 mounted in any convenient manner at the rear end of the planter frame. From the said guide roller 13 the cable passes up to and over a guide roller 14 which is carried in a suitable housing or bracket 15 secured to the seat frame 16, and within the said housing 15 is journaled a second roller or pulley 17 under which the cable passes and by which it is held out of contact with the edges of the housing in the operation of shifting the marker from one to the other side of the planter. Cutting or wearing away of the cable by the edge of the housing is, therefore, prevented. The rear end of the cable is secured to the marker arm 18, as shown at 19, by means of a bracket or lug so that the rear portion of the cable will lie transversely to the frame and substantially parallel with the marker arm. The marker arm is pivoted at its inner end within a clip or U-shaped bracket 20 which is in turn pivoted to a supplemental frame 21 rigidly secured to and projecting rearwardly from the rear end of the planter frame. Inasmuch as the end of the marker arm is supported below the housing 15 which is secured to the upper portion of the seat frame 16, the cable will extend upwardly and inwardly from the marker arm so that a pull upon the cable will raise the arm, as will be readily understood. An arcuate track or rail 22 is secured to the supplemental frame 21 and projects vertically above the same. Upon the marker arm and extending toward the said arcuate track or rail is a bracket 23 carrying a roller 24 adapted to bear against the said rail and thereby guide the marker in its movement from side to side, so that it will not strike upon any part of the planter frame and, at the same time, the frictional wear between the contacting parts will be minimized. A brace 25 extends from the planter frame to the upper portion of the guide rail so as to prevent flexing of the said rail.

It is thought the operation of the device will be readily understood from the foregoing description, taken in connection with the accompanying drawings. When the device is in its normal position, as shown in Fig. 1, the foot lever bears against the stop 5 on the horseshoe-shaped cam track 4 and the draft exerted upon the marker arm and from the same through the cable 12 to the supplemental lever 10 holds the said lever in a substantially horizontal position with its front end near the upper extremity of the forward portion of the cam guide or track 4. Inasmuch as the foot lever cannot move rearwardly beyond the stop 5, the marker will be held to its work and will mark the ground as the planter is drawn over the field in the usual manner, it being understood that the free end of the marker is equipped with the usual shoe or rolling disk. When the planter has reached the end of the row or the side of the field, the driver pushes the foot lever forwardly, thereby causing it to swing about its fulcrum pin 8. This movement of the foot lever in turn causes the forward end of the supplemental lever to ride downwardly and forwardly upon the cam guide 4, and, as the forward end of the supplemental lever thus rides downwardly, the rear end of the same will be caused to swing forwardly and upwardly, thereby drawing upon the cable 12 so as to lift the marker arm, as will be readily understood. The forward end of the supplemental lever will reach the lower portion of the cam guide 4 before the foot lever reaches the forward limit of its movement and the continued forward movement of the foot lever will then cause the supplemental lever to oscillate about its pivotal connection 26 with the foot lever at an accelerated speed, thereby drawing the marker arm past the center of the track 22 so that the upper end of the marker arm will then have moved past the vertical plane of its pivotal support. The foot lever then being released, the weight of the marker arm will cause it to swing downwardly and engage the ground at the side opposite that side of the planter which it formerly occupied. This downward movement of the marker arm will, of course, draw upon the cable 12 so as to return the levers 6 and 10 to their initial normal positions. When the marker arm is in the position illustrated in Fig. 1 of the drawing the cable 12 passes under the guide roller 17, as shown in Fig. 5, and as the marker arm is raised the cable will fit in the groove in said roller so that it will be held out of contact with the housing 15 and cannot be cut by the same. As the marker passes beyond the central vertical plane of the machine the cable will drop toward the guide roller 14 and will then pass beyond the portion of the cable between the said roller and the guide roller 13 so that the two portions of the cable will then lie in intersecting planes, but the said guide rollers are so relatively located that the said two portions of the cable will not be in contact and, consequently, cannot wear upon each other. When the planter has returned to that side of the field from which it first started, the foot lever or treadle 6 is again pushed forward so that the same movement of the levers occurs and the marker will then be returned to that side of the planter at which it was orignally disposed.

It will be readily seen that I have provided an exceedingly simple device by the use of which the marker arm may be shifted to either side of the planter without the driver dismounting and with very little effort. The peculiar arrangement of the cam guide 4 is very effectual, inasmuch as a slight movement of the lever 6 causes an amplified movement of the supplemental lever 10 and thereby draws upon the cable 12 to a sufficient extent to raise the marker arm and carry it beyond a vertical plane. Moreover, this movement of the rear end of the supplemental lever will be at a greater speed than that imparted to the foot lever and, consequently, the marker arm will acquire sufficient momentum to carry it beyond the vertical plane or possible dead center, so that the reversing of the marker will be positive. This certainty of action of the marker is further assured because the housing 15 containing the upper guide rollers is located in the central longitudinal plane of the machine, while the guide roller 13 is located adjacent the side thereof in order to cause the cable to extend longitudinally of the machine between said guide roller and the supplemental lever.

The several parts of my marker operating mechanism are very simple in their construction and are arranged close to the side of the planter frame so that they will not interfere in any way with the operation of the ground wheels or of the seed dropping mechanism.

The lower end of the foot lever may be fulcrumed in any convenient manner upon the cam rail 4, but is preferably spaced therefrom to permit the supplemental lever to play between the foot lever and the said rail, thereby permitting the guide pin or roller 11 at the front end of the supplemental lever to engage the cam track without any hindrance from or interference with the foot lever. To guard against bending of the fulcrum pin 8, I provide a bracket 27 which is secured to the side of the foot lever and fits over the inner end of said pin, but this bracket is not essential and may be omitted without involving any departure from the invention. The supplemental frame 21 is not indispensable and the guide 22 may be secured directly to the rear end of the planter frame, as will be obvious to those skilled in the art. The seat frame 16 may, of course, be of any preferred construction and other changes may be made in the minor details of construction and arrangement of the parts without involving a departure from the spirit of my invention as the same is defined in the following claims.

What I claim is:—

1. The combination with a planter frame, of a marker arm pivotally supported at its inner end upon the frame, a substantially elliptical cam guide secured upon the frame, a lever fulcrumed adjacent the lower portion of the guide and projecting upward above the same, a supplemental lever pivoted between its ends to the first-mentioned lever above the fulcrum thereof and having its forward end disposed to travel upon the elliptical cam guide, and flexible connections between the rear end of said supplemental lever and the marker arm.

2. A land marker comprising a pivotally supported marker arm, a cam guide adapted to be secured upon a planter frame, a compound lever fulcrumed adjacent said guide and having one member arranged to ride upon the same, and flexible connections between the said lever and the marker arm.

3. A land marker comprising a pivotally supported marker arm, a cam guide adapted to be secured to a planter frame, a compound lever having one member fulcrumed adjacent the said guide and another member pivoted to the first-mentioned member and having one end arranged to ride upon the said guide, and flexible connections between the last-mentioned member of the lever and the marker arm.

4. A land marker comprising a pivotally supported marker arm, a cam guide adapted to be secured to a planter frame, a lever fulcrumed at its lower end adjacent said guide, a supplemental lever pivoted between its ends to the first-mentioned lever above the fulcrum thereof and having its front end arranged to ride upon the said cam guide, and a flexible connection between the rear end of the supplemental lever and the marker arm.

5. A land marker comprising a pivotally supported marker arm, a foot lever adapted to be mounted upon a planter frame, a supplemental lever pivoted between its ends to the said foot lever, a flexible connection between the supplemental lever and the marker arm, and means whereby vibration of the foot lever will cause an amplified and accelerated movement of the supplemental lever.

6. A land marker comprising a pivotally supported marker arm, a lever adapted to be mounted upon a planter frame, a connection between said lever and the marker arm, and a stop arranged in rear of and adapted to be engaged by the said lever whereby the draft upon the marker arm will hold the same in its normal position.

7. The combination with a planter frame, of a marker arm pivotally supported at its inner end upon the planter frame, a guide roller disposed at one side of the planter frame, an operating lever mounted upon the same side of the planter frame, a guide roller supported at the center of the planter frame and above the pivot of the marker arm and the first-mentioned guide roller, and a cable attached to the marker arm and passing over the upper guide roller and under the first-mentioned guide roller and attached to the said lever.

8. The combination with a planter frame, of a housing secured thereto, a pair of guide rollers mounted in said housing, a marker arm pivotally attached to the planter frame below said housing, a lever mounted upon the frame, a guide roller upon the frame at one side thereof, a cable attached to the lever passing under the last-mentioned guide roller and thence up to and over one of the first-mentioned guide rollers and under the other of said first-mentioned guide rollers and attached to the marker arm.

In testimony whereof I affix my signature in presence of two witnesses.

FRANK G. CARPENTER. [L. S.]

Witnesses:
W. F. HARRISON,
JOHN D. FRAY.

Copies of this patent may be obtained for five cents each, by addressing the "Commissioner of Patents, Washington, D. C."